(12) United States Patent
Kragten et al.

(10) Patent No.: US 7,785,555 B1
(45) Date of Patent: Aug. 31, 2010

(54) SYNTHESIS OF LIZARDITE FROM OLIVINE

(75) Inventors: David D. Kragten, Burnsville, NC (US); Chris Capobianco, Asheville, NC (US)

(73) Assignee: Unimin Corporation, New Canaan, CT (US)

( * ) Notice: Subject to any disclaimer, the term of this patent is extended or adjusted under 35 U.S.C. 154(b) by 0 days.

(21) Appl. No.: 12/100,072

(22) Filed: Apr. 9, 2008

Related U.S. Application Data

(60) Provisional application No. 61/019,396, filed on Jan. 7, 2008.

(51) Int. Cl.
*C01B 33/24* (2006.01)
*C01B 33/00* (2006.01)
*B01J 21/14* (2006.01)

(52) U.S. Cl. ........................ 423/331; 423/324; 502/251

(58) Field of Classification Search ................. 423/324, 423/331
See application file for complete search history.

(56) References Cited

U.S. PATENT DOCUMENTS 3,888,793 A * 6/1975 Arey et al. .................. 502/241
4,260,498 A * 4/1981 Sample et al. ............... 508/140

FOREIGN PATENT DOCUMENTS

JP 61146706 A * 7/1986

OTHER PUBLICATIONS

Serpentine Minerals Hydrothermally Synthesized and their Microstructures, Yada et al, Journal of Crystal Growth 24/25 (1974) 627-630.*
Caruso et al., "The Stability of Lizardite", Canadian Mineralogist, vol. 17, pp. 757-769 (1979).
Iishi, Kazuaki, "Synthesis of Antigorite", American Mineralogist, vol. 58, pp. 915-919 (1973).

* cited by examiner

*Primary Examiner*—Jerry Lorengo
*Assistant Examiner*—Joseph V Micali
(74) *Attorney, Agent, or Firm*—Rankin, Hill & Clark LLP

(57) ABSTRACT

Methods of converting olivine to lizardite without formation of chrysotile or brucite are disclosed. The methods comprise heating a mixture of olivine, silica, water, and a caustic agent. The addition of silica allows for complete conversion of the olivine to lizardite through a more thermodynamically favorable reaction. The olivine and silica are preferably of small particle size to increase reactivity.

18 Claims, 7 Drawing Sheets

SYNTHESIS OF LIZARDITE FROM OLIVINE

This application claims priority from U.S. Provisional Patent Application Ser. No. 61/019,396, filed Jan. 7, 2008. That provisional application is hereby fully incorporated by reference herein.

BACKGROUND

The present disclosure generally relates to methods of synthesizing lizardite from olivine. Also included are various products formed from these methods.

Olivine is a natural occurring mineral comprising magnesium-iron silicates of the formula $(Mg,Fe)_2SiO_4$. It is generally an olive-green colored mineral and is found in igneous and metamorphic rocks, meteorites, and blast-furnace slags. A complete series of magnesium to iron variations exists from $Mg_2SiO_4$ to $Fe_2SiO_4$. The ratio of magnesium and iron varies between the two endmembers of the solid solution series, forsterite ($Mg_2SiO_4$) and fayalite ($Fe_2SiO_4$). The minerals crystallize in the orthorhombic system and have a vitreous luster, a hardness of about 6.5 to 7 on the Mohs scale, and a specific gravity of about 3.27 to about 3.37. Nearly all naturally occurring olivine deposits for industrial mineral applications are about 91-95% forsterite. The remaining fayalite component is partially removed during processing.

Olivine is industrially used in foundry applications for its refractory properties. Olivine is also used for sand blasting for its hardness and because it will not produce hazardous silica dust. To obtain olivine, ore is generally ground up and the resulting particles classified by size. The consequent waste product generally takes the form of fine olivine dust. It would be desirable to use this waste product in further applications.

It would also be beneficial to synthesize lizardite from olivine. In this regard, lizardite is a hydrous magnesium silicate of the formula $Mg_3Si_2O_5(OH)_4$. Among other applications, lizardite may be used as a functional filler in, for example, polymeric resins.

BRIEF DESCRIPTION

Disclosed, in various embodiments, are methods for synthesizing lizardite from olivine. Also disclosed are products made by the methods.

In embodiments, a process for synthesizing lizardite from olivine comprises:
providing a reaction mixture comprising olivine, silica, water, and a caustic agent; and
heating the reaction mixture for a period of time to obtain lizardite.

The caustic agent may be selected from the group consisting of sodium hydroxide and potassium hydroxide. The caustic agent may be present in an amount of at least 21 weight percent of the liquid phase of the reaction mixture. In other specific embodiments, the caustic agent may be present in an amount of from about 25 weight percent to about 33 weight percent of the liquid phase of the reaction mixture.

The reaction mixture may be heated at a temperature of about 170° C. or higher, such as from about 170° C. to about 210° C.

The reaction mixture may be heated for about 12 hours or longer, such as from about 12 hours to about 24 hours.

The molar ratio of olivine to silica may be approximately 3:1, which is the stoichiometric proportion when using forsterite as feed.

Other salts, for example, those containing cations (such as Al, Mg, Li) that could form part of the lizardite structure, may be added to the reaction mixture to alter the composition of the lizardite. The lizardite product may also be modified by heat or acid treatment, or by surface treatment such as silanes, titanates, and surfactants.

The process may include additional processing steps. For example, the olivine may be washed with an acid prior to providing the olivine to the reaction mixture. The lizardite may be separated from the reaction mixture.

The resulting lizardite has an average diameter of less than 1 micron and a thickness of from about 30 to about 80 nanometers. The resulting lizardite may alternatively have a BET surface area of 10 $m^2/g$ or more.

Lizardite made from such processes are also disclosed and may be different from natural lizardite.

These and other non-limiting characteristics are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
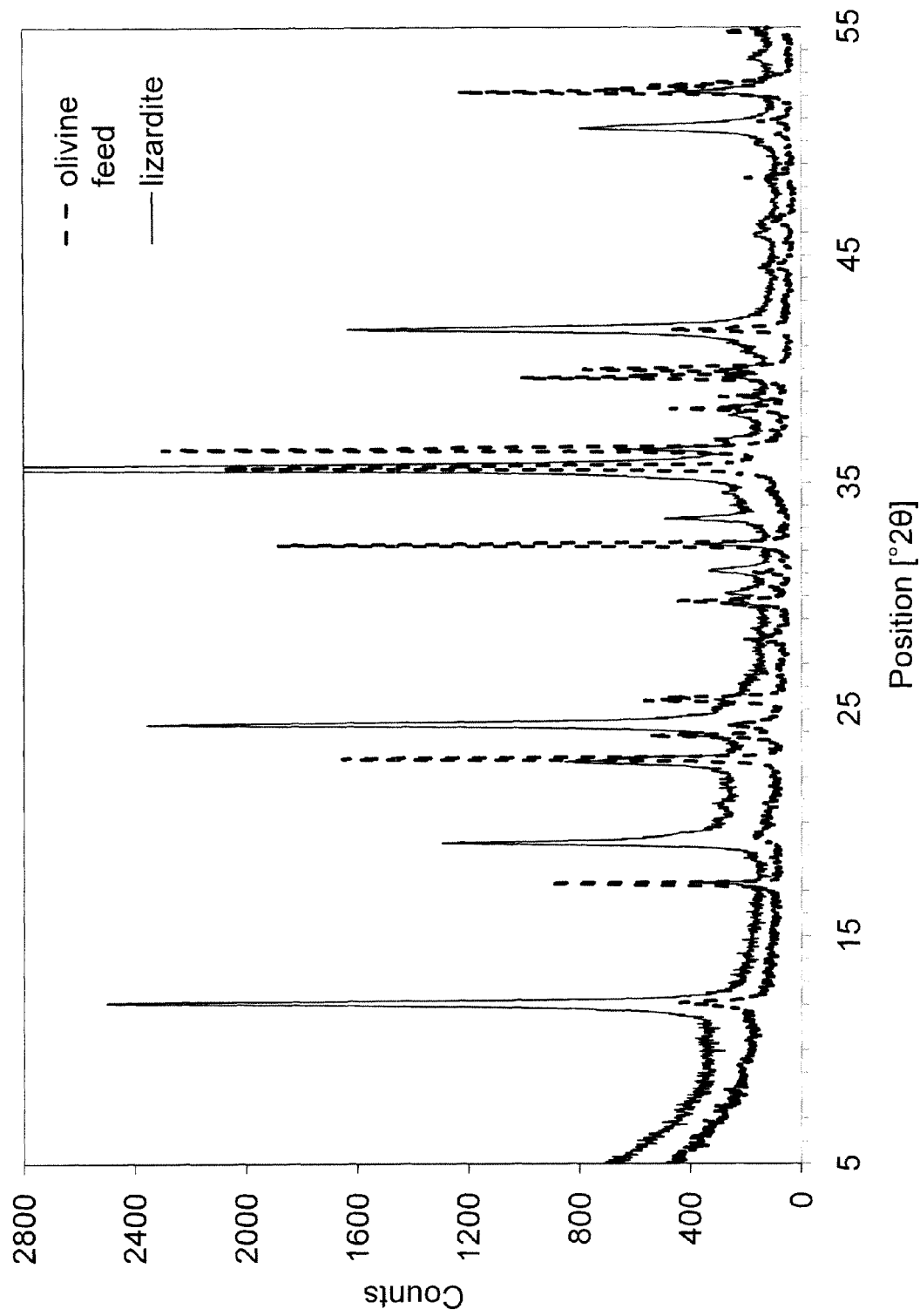
FIG. 1 is an XRD diagram showing two diffraction patterns: (a) olivine feed material, and (b) lizardite product made with a stoichiometric proportion of olivine and silica.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the materials or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Olivine can be used to produce mineral phase lizardite. Lizardite is a hydrous magnesium silicate of the formula $Mg_3Si_2O_5(OH)_4$. Lizardite is also a natural weathering product of olivine. Weathering products of olivine are members of the class of minerals known as serpentines. The serpentine minerals generally have the same formula $(Fe,Mg)_3Si_2O_5(OH)_4$. However, natural serpentines generally include at least some amount of fibrous phase chrysotile. The fibrous morphology of chrysotile makes it a health hazard. In contrast, lizardite has a plate-like morphology, with a high aspect ratio and no known health risks. In some aspects, the methods of the present disclosure allow for the formation of lizardite without the formation of chrysotile.

A suitable phase of olivine for the present disclosure is forsterite. Olivine reacts with water to form lizardite and brucite according to reaction equation (1):

$$2Mg_2SiO_4 + 3H_2O \rightarrow Mg_3Si_2O_5(OH)_4 + Mg(OH)_2 \quad (1)$$

However, with the addition of silica, olivine can be completely converted to lizardite according to reaction equation (2):

$$3Mg_2SiO_4 + 4H_2O + SiO_2 \rightarrow 2Mg_3Si_2O_5(OH)_4 \quad (2)$$

Reaction equation (2) is also thermodynamically more favorable than reaction equation (1). The olivine and silica are preferably of small particle size to increase reactivity.

A reaction mixture comprising olivine, silica, water, and a caustic agent is heated to drive the reaction. The reaction mixture may be heated at a temperature of about 170° C. or higher. In further embodiments, the temperature may be from about 170° C. to about 210° C. or from about 200° C. to about 210° C. The reaction time is about 12 hours or longer. In further embodiments, the reaction time is from about 12 hours to about 24 hours. The pressure is achieved autogenously. At lower temperatures and shorter reaction times, brucite is typically formed as an undesired but harmless side product.

Addition of sufficient silica completely inhibits the formation of undesired chrysotile. In embodiments, the molar ratio of olivine to silica (olivine:silica) is approximately 3:1, which is the stoichiometric proportion given by reaction (2).

The olivine may be pretreated to increase the reaction rate. In some embodiments, the olivine is pretreated by washing it with an acid.

The caustic agent included in the reaction mixture is believed to act as a catalyst for the reaction. An exemplary caustic agent is sodium hydroxide. In embodiments, the caustic agent is present in the reaction mixture in the amount of from about 21 weight percent or higher, based on the weight of the liquid part of the reaction mixture. In further specific embodiments, the caustic agent is present in the reaction mixture in the amount of from about 28 weight percent or higher, based on the weight of the liquid part of the reaction mixture, or from about 25 weight percent to about 33 weight percent, based on the weight of the liquid part of the reaction mixture. In other embodiments, the caustic agent is present in the amount of from about 25 weight percent to about 33 weight percent of the reaction mixture.

An exemplary reaction mixture comprises 2.76 grams olivine, 0.39 grams silica, 7.70 grams sodium hydroxide (NaOH), and 20.0 grams of deionized water.

The lizardite formed from the heating can be separated by methods known in the art. For example, the lizardite can be separated by filtration or centrifugation of the reaction mixture and/or washing to remove the other components. Typically, washing is performed with water, which could be acidified.

If desired, the lizardite particles can be surface modified prior to isolation. For example, the particles may be treated with silanes, titanates, and/or surfactants. These surface treatments can increase dispersion of the particles in a resin system. Such surface treatment can require the application of high shear forces, e.g. by use of a Cowles blade or planetary ball mill, to break up agglomerated and/or partly aggregated particles to ensure the modification of all surfaces.

The lizardite synthesized by the methods of the present disclosure is generally in the form of flaky particles having nanoscale dimensions. In particular, the lizardite can be synthesized without the formation of chrysotile. Typically, the particles have an average diameter of less than 1 micron and a thickness of from about 10 to about 100 nanometers as observed with SEM. In further embodiments, the thickness may be from about 30 to about 50 nanometers or from about 30 to about 80 nanometers. The particles have a surface area in excess of 10 $m^2/g$ as determined by BET. Weight loss by dehydroxylation, which is endothermic, takes place from 500° C. to 700° C. A typical chemical composition of lizardite as determined by X-ray fluorescence (XRF) is shown in Table 1 below.

TABLE 1

|  | Wt % |
| --- | --- |
| $Al_2O_3$ | 0.40 |
| $SiO_2$ | 36.31 |
| $Fe_2O_3$ | 7.45 |
| $TiO_2$ | 0.02 |
| MgO | 40.68 |
| CaO | 0.24 |
| $K_2O$ | <0.01 |
| $Na_2O$ | 2.72 |
| $SO_3$ | <0.01 |
| $P_2O_5$ | <0.01 |
| Loss on Ignition | 12.19 |

The lizardite may be useful in several applications. For example, it could be an alternative to nanoclay as a functional filler for reinforcing polymeric resins, a flame retardant, or a barrier to gas diffusion. Other applications may include absorbing metal ions and organics from water, or as a catalyst for oxidation reactions.

The following example is provided to illustrate the methods of the present disclosure. The examples are merely illustrative and are not intended to limit devices made in accordance with the disclosure to the materials, conditions, or process parameters set forth therein.

EXAMPLE

Finely ground olivine dust from Hamilton, Wash., was obtained. Reagent-grade sodium hydroxide was obtained from GFS Chemicals. Silica gel (Sigma) had a surface area of 750 $m^2/g$. All elements other than sodium were present at less than 100 ppm.

Hydrothermal treatment was accomplished in a 45 mL Teflon-lined Parr bomb loaded with deionized water, olivine, and silica. The caustic solution used for the treatment was 28 wt % based on the liquid fraction. Three different reaction mixtures were used, as shown in Table 2.

TABLE 2

| | Sample ID | water (mL) | NaOH (g) | olivine (g) | silica (g) |
| --- | --- | --- | --- | --- | --- |
| Mixture 1 | 115-96-1 | 20 | 7.694 | 2.727 | 0.393 |
| Mixture 2 | 115-96-2 | 20 | 7.722 | 8.305 | 0.395 |
| Mixture 3 | 115-96-3 | 20 | 7.704 | 2.770 | 1.176 |

In Mixture 1, the reactants silica and olivine were added in a proportion to match the stoichiometry of lizardite (3:1). Mixture 2 contained a large excess of olivine and Mixture 3 contained a large excess of silica. All mixtures were heated for 24 hours at 200° C. to 210° C. After the reaction, caustic and other soluble components were removed by extensive washing. The solids were suspended in ample deionized water and separated by centrifugation at 2400 rpm for 20 minutes; this was repeated until the pH of the liquid was about 10 and did not change substantially. After drying at 110° C. in air, the three products were analyzed with XRD, SEM, BET, and TGA-DSC. The products obtained with reaction mixtures 1 through 3 are referred to as products 1 through 3.

XRD Analysis:

XRD analysis is complicated by the high similarity in patterns between lizardite, chrysotile, and olivine. Few reflections can be uniquely assigned, and combination with other methods is needed for identification. However, XRD could be used to obtain a sense of what phases are present and what fraction of olivine is converted.

XRD patterns of the three products were very similar. Differences between the products and olivine feed were mostly apparent by differences in intensity, rather than the presence or absence of specific reflections. Lizardite was identified in all three products. Reflections due to brucite were not present in any of the samples. For all reaction mixtures, it was clear that olivine reacted and formed lizardite.

The XRD patterns for products 1 and 2 were nearly identical. The XRD pattern for product 3 was slightly different. Most apparent were two very broad peaks located at 7.036° and 29.039°, which indicates the presence of another phase in addition to lizardite. Product 3 also differed in the intensities of the peaks, which could indicate that the lizardite produced was slightly different from that prepared with reaction mixtures 1 and 2.

FIG. 1 is a diagram showing the XRD patterns for product 1 and olivine feed material.

Figure 2:
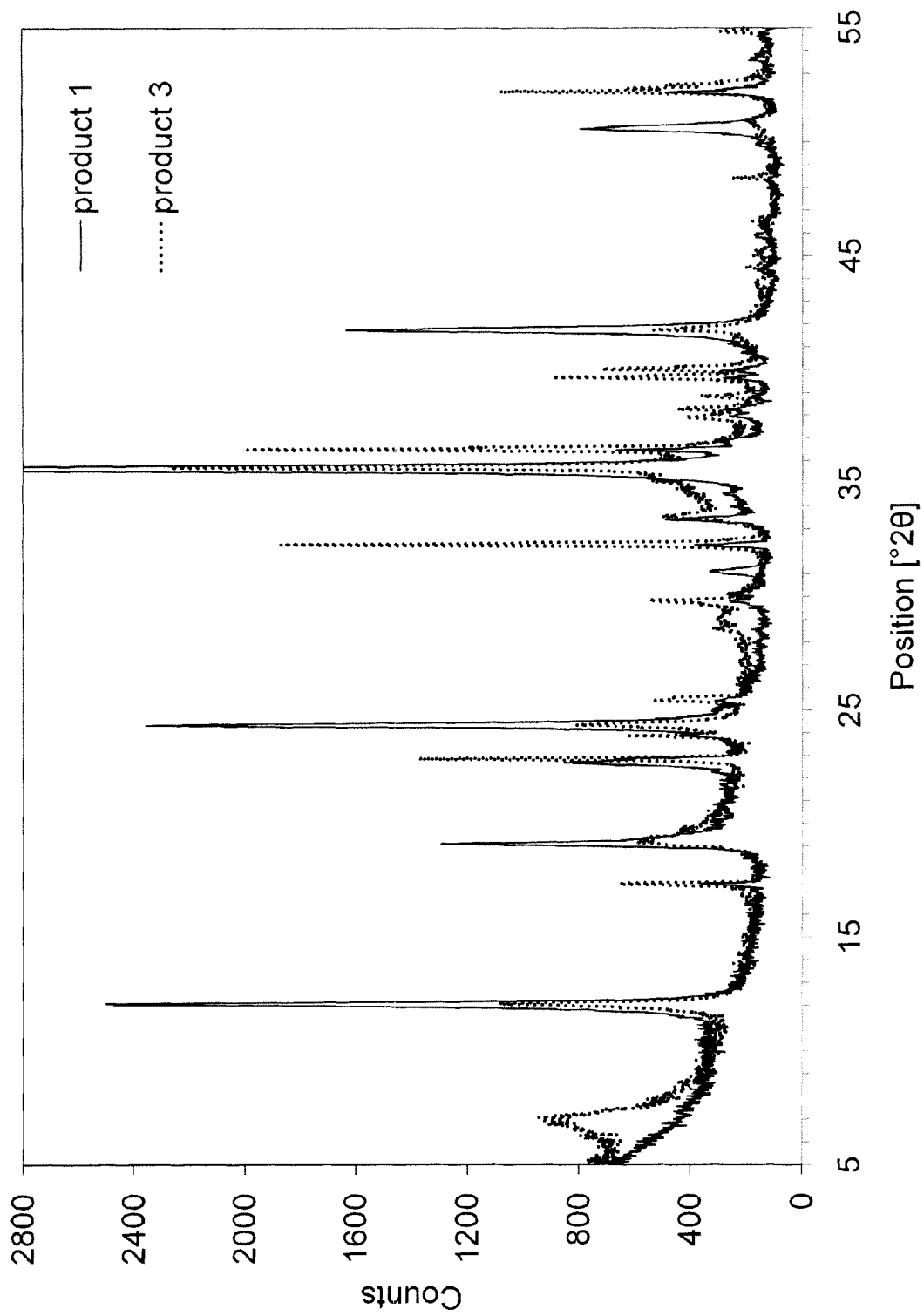
FIG. 2 is an XRD diagram of lizardite prepared from a stoichiometric amount of olivine and silica and lizardite prepared with an excess of silica.

FIG. 2 is a diagram showing the XRD patterns for products 1 and 3.

Figure 3A:
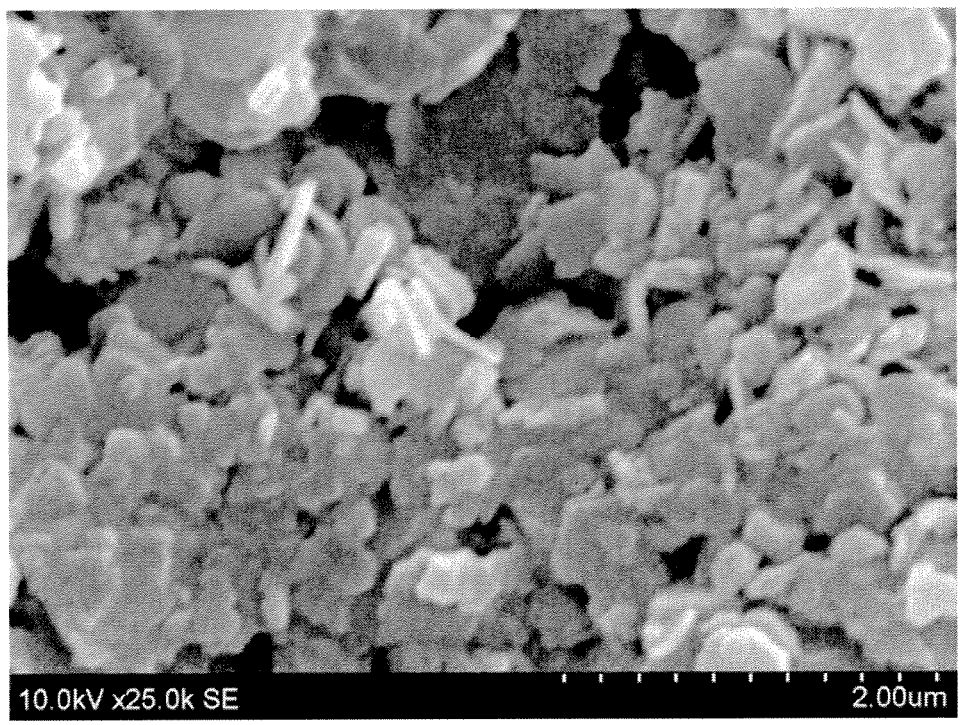
FIGS. 3A and 3B are two SEM images of lizardite formed from a stoichiometric amount of olivine and silica.
Figure 3B:
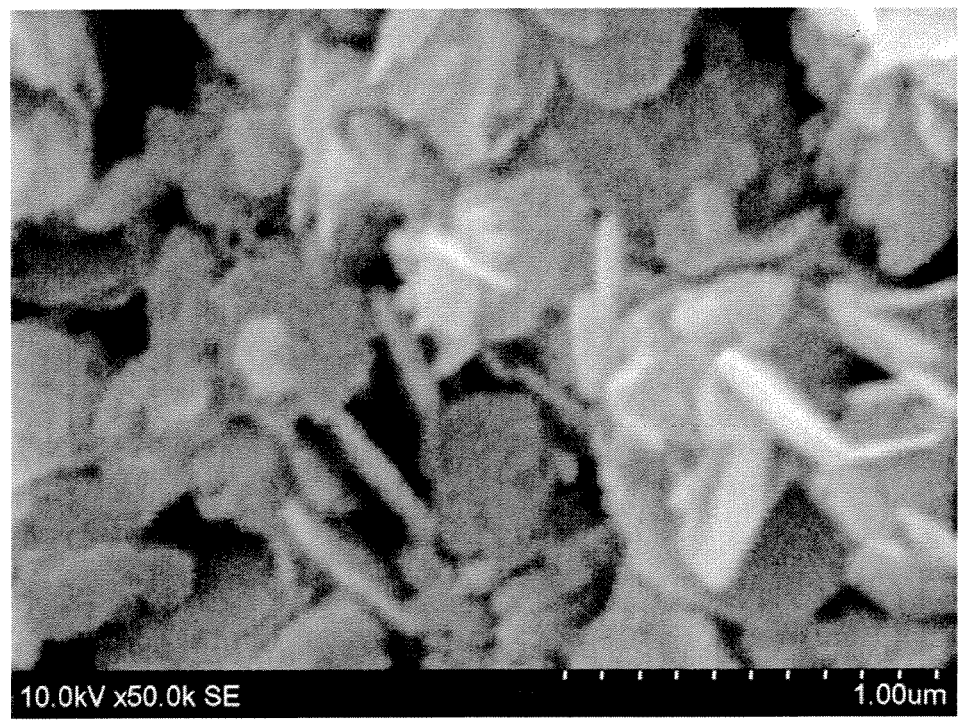

SEM Analysis:

SEM images showed that nanoscale platelike particles were formed with a thickness of about 30-50 nanometers and very high aspect ratio. For product 1, only platelike particles were observed. No unreacted olivine or fibers were observed. As discussed above, XRD shows that also no brucite is formed. These facts indicated that the reaction was complete and highly selective. FIGS. 3A and 3B show two SEM images from product 1.

Figure 4A:
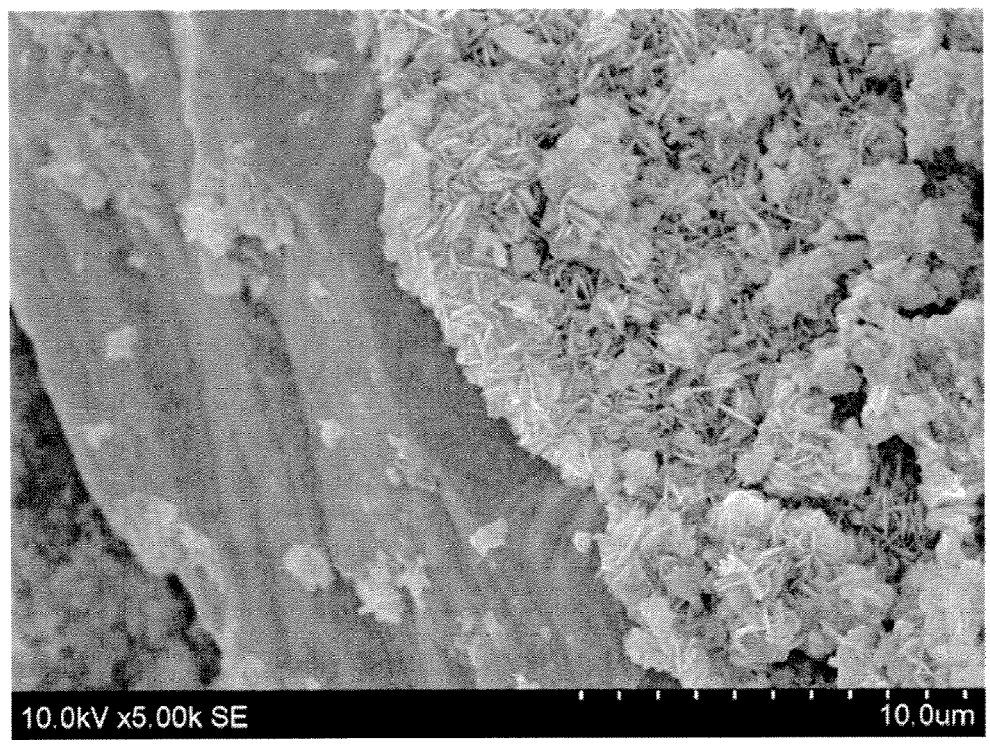
FIGS. 4A and 4B are two SEM images of lizardite formed from an excess of olivine.
Figure 4B:
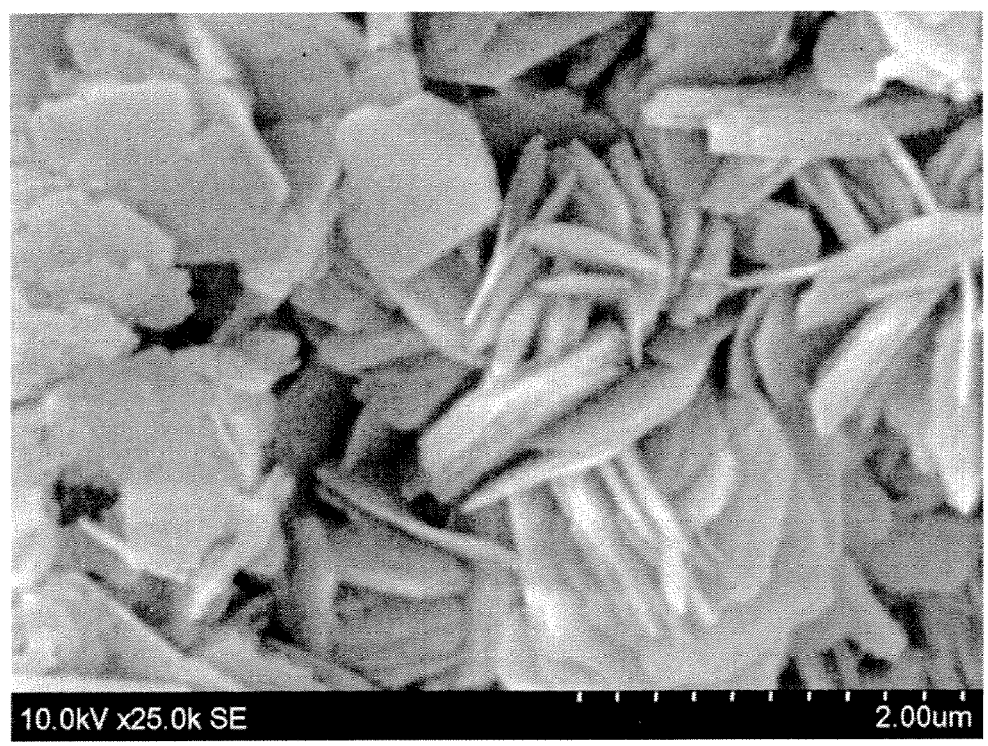
Figure 5A:
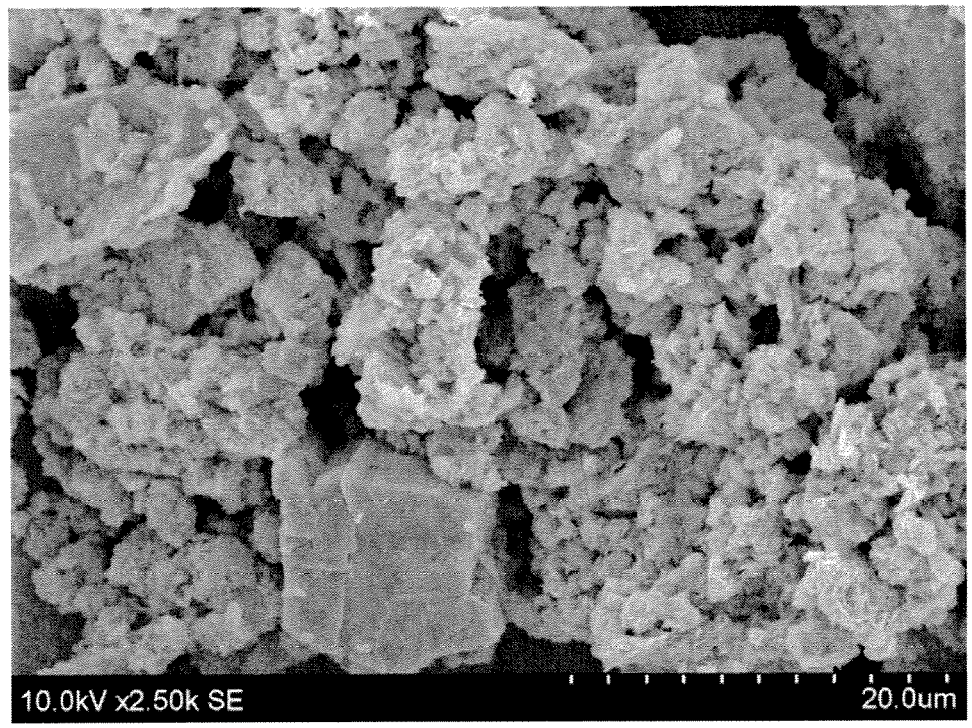
FIGS. 5A and 5B are two SEM images of lizardite formed from an excess of silica.
Figure 5B:
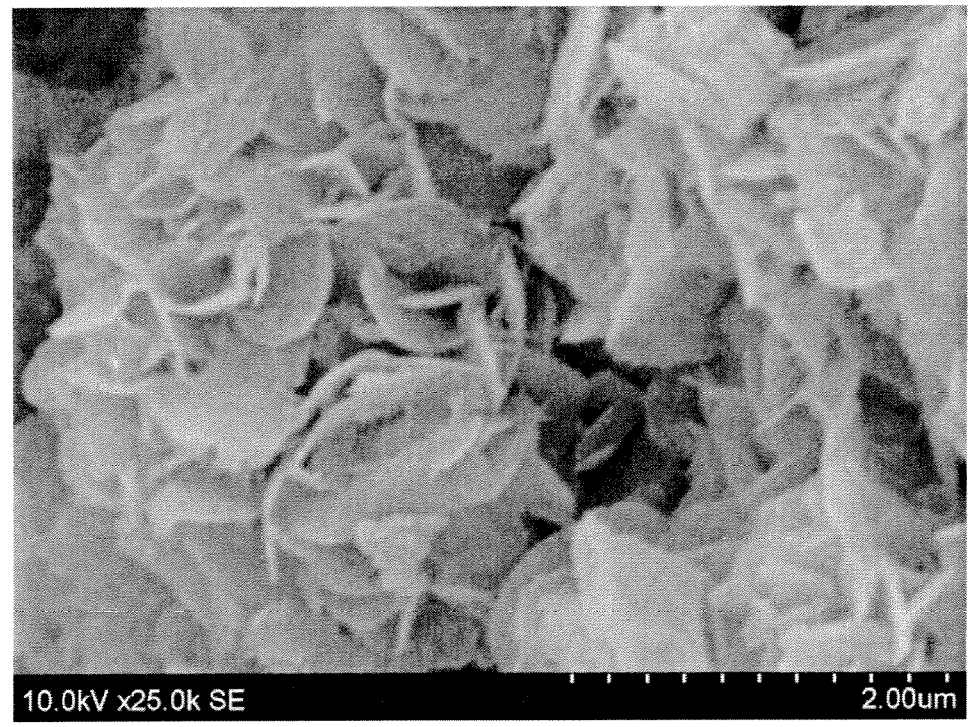

In products 2 and 3, most of the lizardite appeared to be made up of platelike particles, though some unreacted olivine was present as well. On closer examination, the particles of products 2 and 3 appeared to be better formed compared to product 1. The particles of product 3 appeared less flat and showed some signs of curvature. These particles may have some characteristics of fibrous chrysotile and suggest that a slight excess of olivine is preferable. FIGS. 4A and 4B show two SEM images from product 2. FIGS. 5A and 5B show two SEM images from product 3.

BET Analysis:

BET surface areas were measured as 14.5, 25.6, and 17.4 $m^2/g$ for products 1, 2, and 3, respectively. From these surface areas and the density of lizardite (2.65 g/mL), an estimate of the particle size can be made. Based on the equivalent sphere radius, the size calculated for product 1 was 78 nanometers.

TGA-DSC Analysis:

TGA-DSC analysis was in agreement with lizardite formation. A large weight loss was observed from about 460 to 680° C.; this corresponds to an endothermic reaction due to dehydroxylation. For products 1 and 2, the magnitude of the weight loss was very close to the theoretical weight loss expected for lizardite (11.80%). This was in agreement with total conversion to lizardite. An exothermic peak was observed around 742° C., which is due to the transition to the anhydrous phases enstatite and forsterite.

Figure 6:
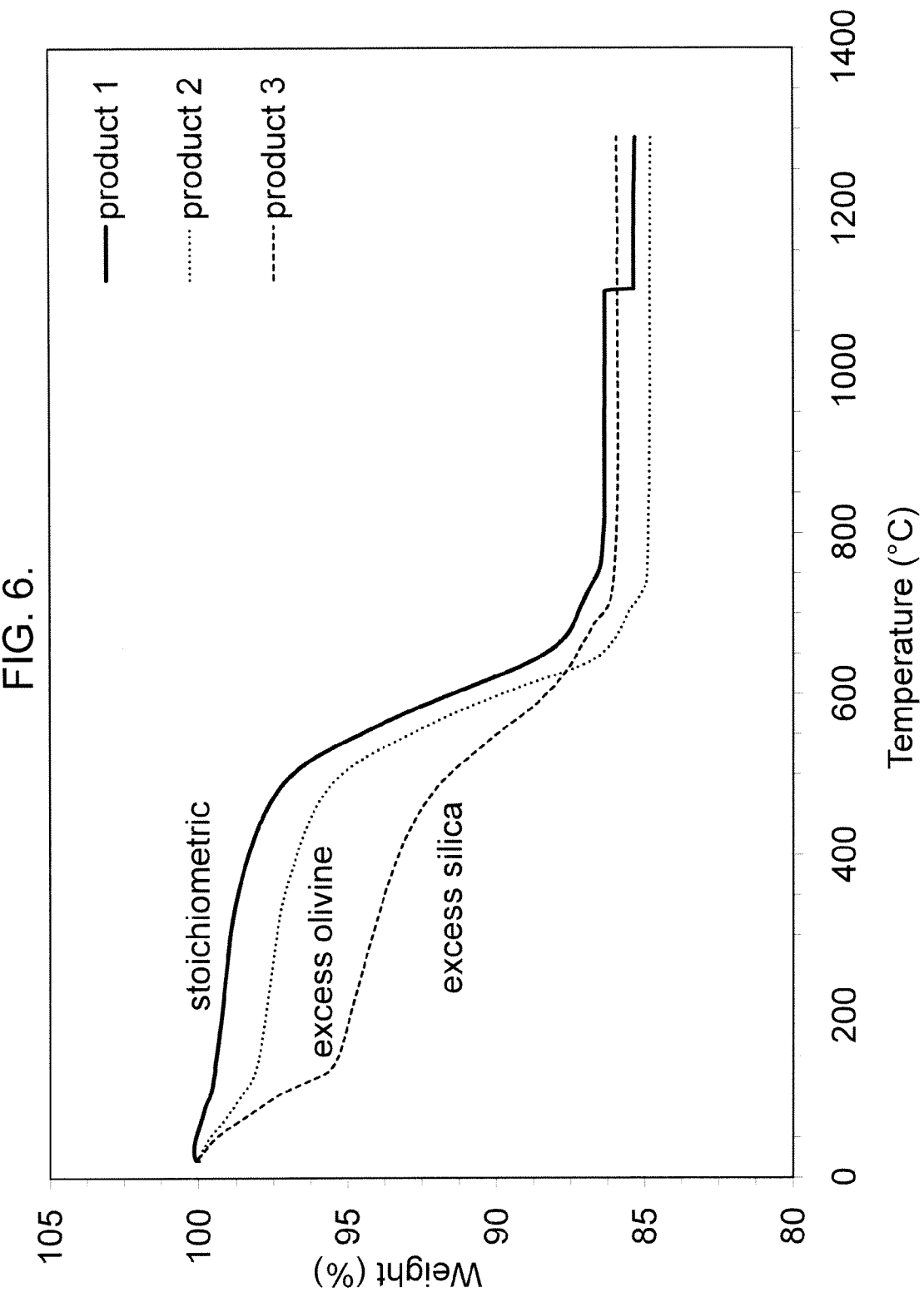
FIG. 6 is a TGA diagram of three different preparations containing olivine and silica in varying amounts.
Figure 7:
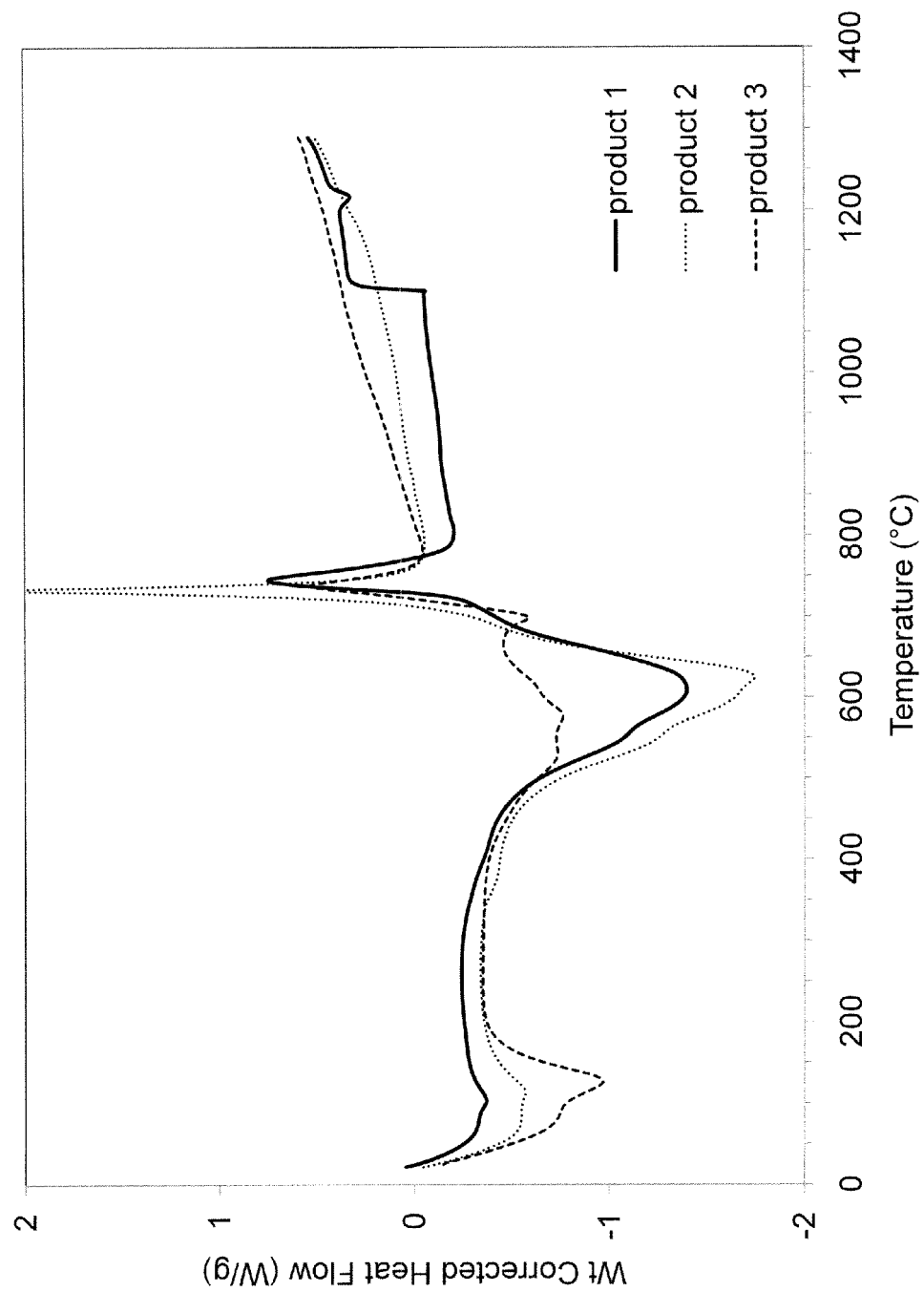
FIG. 7 is a DSC diagram showing the heat flow for the three different preparations.

For product 3, the weight loss took place in the same temperature range but was smaller: the weight loss was about 60 to 70% of that of products 1 and 2. Moreover, the exothermic peak was slightly shifted to a lower temperature of 732° C. The lower weight loss could be attributed to a lower conversion to lizardite: an amorphous phase was formed as well. The small differences in temperature of the exothermic peak could be due to differences in stability of the lizardite particles caused by a slightly different structure or particle size. FIG. 6 is the TGA-DSC diagram. FIG. 7 shows the diagram of weight corrected heat flow.

The materials and methods of the present disclosure have been described with reference to exemplary embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A process for synthesizing lizardite from olivine, comprising:
   providing a reaction mixture comprising olivine, silica, water, and a caustic agent selected from the group consisting of sodium hydroxide and potassium hydroxide; and
   heating the reaction mixture for a period of time to obtain lizardite, which is free of chrysotile.

2. The process of claim 1, wherein the caustic agent is present in an amount of at least 21 weight percent of the liquid phase of the reaction mixture.

3. The process of claim 1, wherein the caustic agent is present in an amount of from about 25 weight percent to about 33 weight percent of the liquid phase of the reaction mixture.

4. The process of claim 1, wherein the reaction mixture is heated at a temperature of about 170° C. or higher.

5. The process of claim 1, wherein the reaction mixture is heated at a temperature from about 170° C. to about 210° C.

6. The process of claim 1, wherein the period of time is about 12 hours or longer.

7. The process of claim 1, wherein the period of time is from about 12 hours to about 24 hours.

8. The process of claim 1, wherein the molar ratio of olivine to silica is approximately 3:1.

9. The process of claim 1, further comprising washing the olivine with an acid prior to providing the olivine to the reaction mixture.

10. The process of claim 1, further comprising modifying the surface of the lizardite.

11. The process of claim 10, wherein the surface is modified with an additive selected from the group consisting of silanes, titanates, and surfactants.

12. The process of claim 1, further comprising separating the lizardite from the reaction mixture.

13. The process of claim 1, wherein the resulting lizardite has an average diameter of less than 1 micron and a thickness of from about 30 to about 80 nanometers.

14. The process of claim 1, wherein the resulting lizardite has a BET surface area of 10 $m^2/g$ or more.

15. The process of claim 1, further comprising washing the lizardite with an acid.

16. The process of claim 1, wherein the reaction mixture further comprises a salt.

17. The process of claim 16, wherein the salt comprises a Al, Mg, or Li cation.

18. A process for synthesizing lizardite from olivine, comprising:

providing a reaction mixture comprising olivine, silica, water, and a caustic agent selected from the group consisting of sodium hydroxide and potassium hydroxide, wherein the molar ratio of olivine to silica is approximately 3:1; and heating the reaction mixture at a temperature of about 170° C. or higher for a period of about 12 hours or longer to obtain lizardite which is substantially free of chrysotile.

* * * * *